United States Patent [19]

Murray et al.

[11] Patent Number: 4,642,876
[45] Date of Patent: Feb. 17, 1987

[54] APPARATUS USEFUL IN THE MANUFACTURE OF ELECTROLYTIC CAPACITORS

[76] Inventors: Myles N. Murray, 15 Skyline Dr., Chagrin Falls, Ohio 44022; Joseph Murphy, 1476 Bradford, Macedonia, Ohio 44056

[21] Appl. No.: 724,458

[22] Filed: Apr. 18, 1985

Related U.S. Application Data

[62] Division of Ser. No. 486,047, Apr. 18, 1983, Pat. No. 4,531,281.

[51] Int. Cl.⁴ .......................... H01G 9/00; H01G 13/00
[52] U.S. Cl. ......................................... 29/570; 29/430; 361/433
[58] Field of Search ................... 29/570, 25.41, 25.42, 29/854, 430, 432, 432.2, 464, 469; 361/433

[56] References Cited

U.S. PATENT DOCUMENTS

| | | | |
|---|---|---|---|
| 3,536,963 | 10/1970 | Boos | 317/230 |
| 3,634,736 | 1/1972 | Boos et al. | 29/570 X |
| 3,648,126 | 3/1972 | Boos et al. | 29/570 X |
| 3,656,027 | 4/1972 | Isley | 361/433 |
| 4,023,079 | 5/1977 | Selover, Jr. et al. | 361/433 |
| 4,362,786 | 12/1982 | Murray | 428/36 |

Primary Examiner—Brian E. Hearn
Assistant Examiner—John T. Callahan
Attorney, Agent, or Firm—Knobbe, Martens, Olson & Bear

[57] ABSTRACT

Electrolytic capacitor cells of paste electrode type are formed integrally in a composite or laminated belt in a predetermined pattern and subsequently severed or otherwise separated therefrom to provide a plurality of individual cells or stacked cell sets of desired shape. The belt includes at least one inner sheet of ion conducting/electron insulating material, outer sheets of electron conducting material, and intermediate sheets of insulating gasket material respectively interposed between the inner sheet and respective outer sheets. Each intermediate sheet has a plurality of holes arranged in a predetermined pattern and aligned with the holes in the other intermediate sheet for accommodating respective electrodes of a like number of pairs which have opposite surfaces in operative contact with the inner and respective outer sheets. The belt is either continuously formed or formed in discrete lengths, and adjacent sheets thereof are either adhesively bonded as by double-sided adhesive tape or bonded by covulcanization.

2 Claims, 10 Drawing Figures

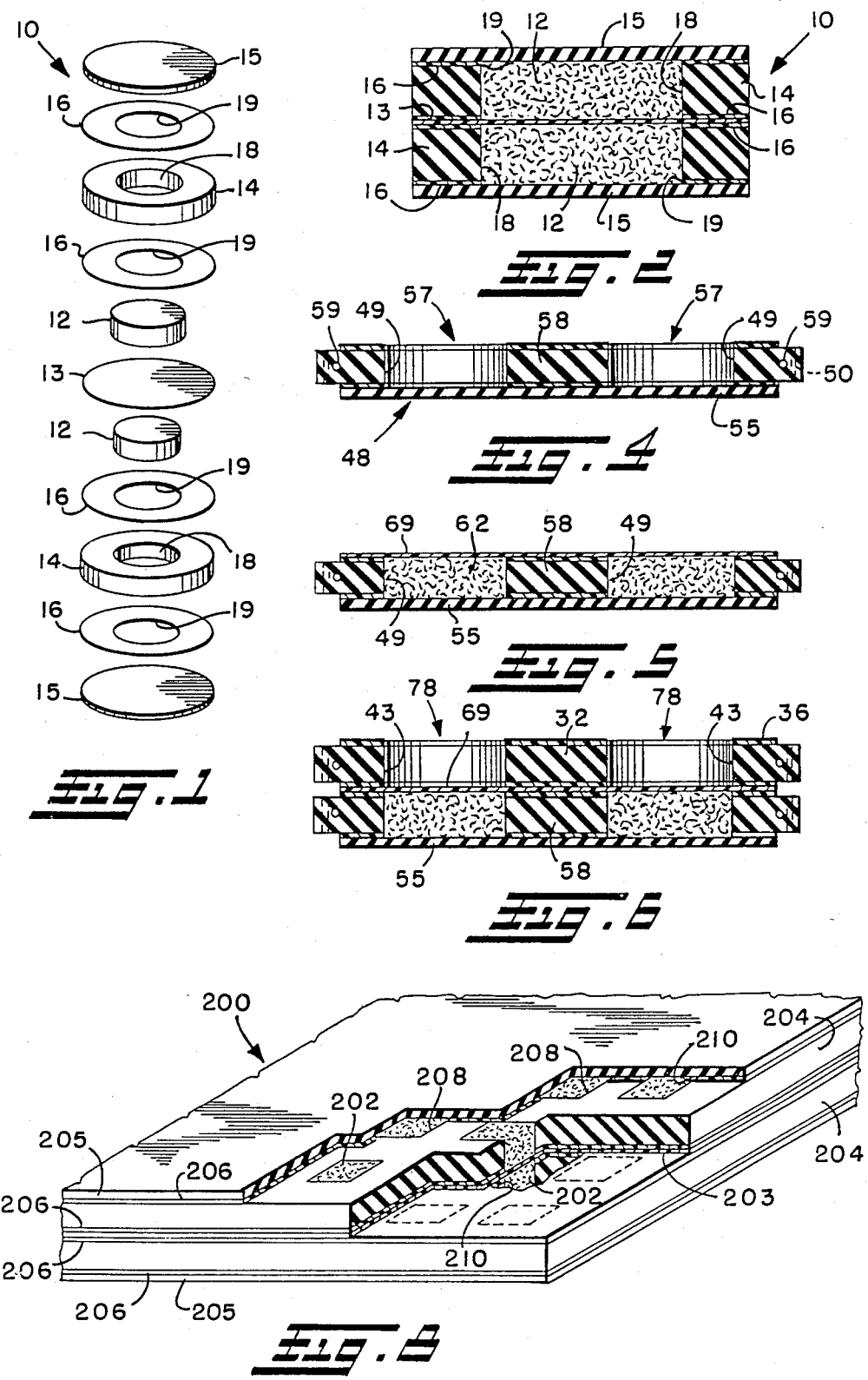

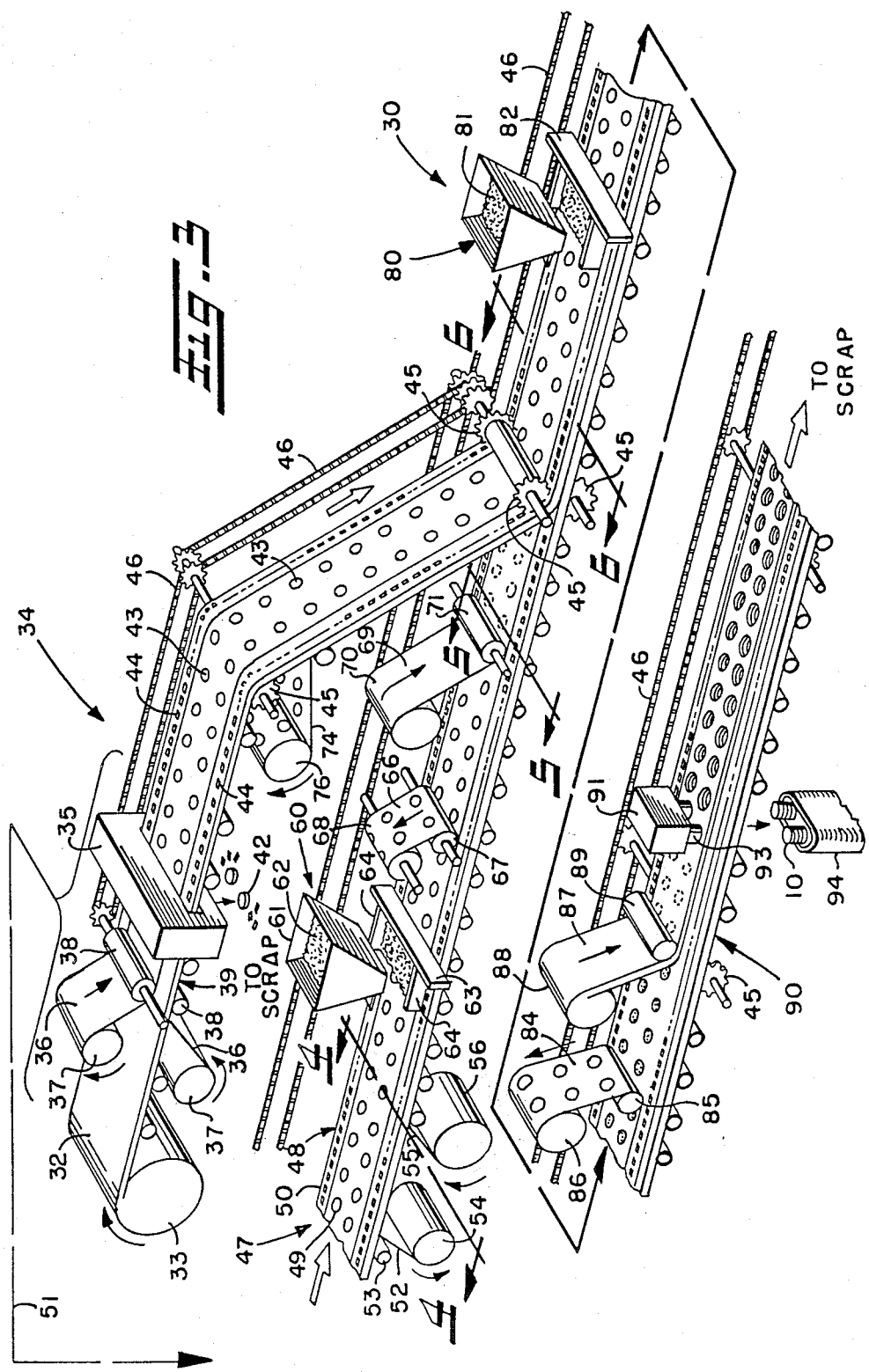

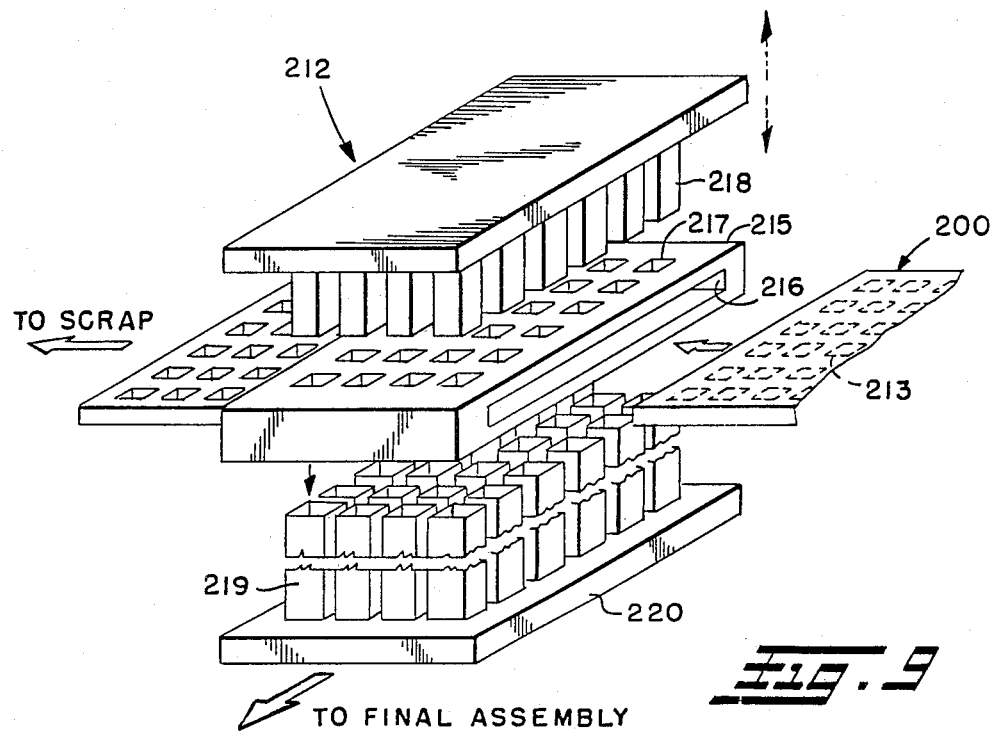
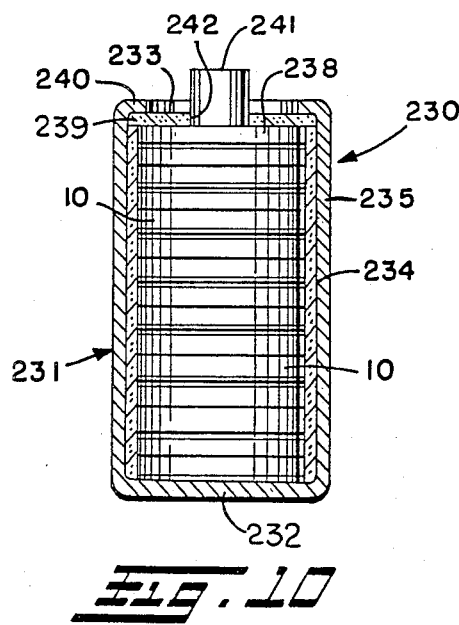

4,642,876

APPARATUS USEFUL IN THE MANUFACTURE OF ELECTROLYTIC CAPACITORS

This application is a division of application Ser. No. 486,047, filed Apr. 18, 1983, now U.S. Pat. No. 4,531,281.

DISCLOSURE

This invention relates generally to electrical energy storage devices and, more particularly, to the manufacture of electrolytic capacitors of the paste electrode type.

BACKGROUND OF THE INVENTION

Electrolytic capacitors of the paste electrode type generally comprise a pair of paste electrodes consisting of finely divided conductive material in admixture with an electrolyte, a separator therebetween which functions as an electron insulator and ionic conductor, and a pair of electrode connectors which function as current collectors and ionic insulators between adjacent capacitor cells. The admixture typically has the consistency of a paste which may be compressed and shaped to form an electrode. Since paste electrodes are not rigid masses and to some extent flexible, annular gaskets of non-conductive material have been employed to confine the electrodes between the separator and respective connectors of each capacitor cell. Electrolytic capacitors of this type to which the subject invention principally is directed are the subject of U.S. Pats. Nos. 3,536,963; 3,634,736; 3,648,128; 3,656,027 and 4,023,079, and reference may be had to these patents for further details of their composition and assembly.

As indicated in the aforenoted patents, individual capacitor cells can be assembled by placing the electrodes in respective annular gaskets which are affixed as by cement to respective connectors. A separator saturated with electrolyte then is interposed between the two electrodes and gaskets and the assemblage compressed at a pressure sufficient to give the resultant cell a composite structure. Unfortunately, this piecemeal assembly procedure can be extremely time consuming and does not readily lend itself to economical manufacture of the capacitor cells at high production rates.

SUMMARY OF THE INVENTION

The subject invention principally provides a method of economically manufacturing capacitor cells of the foregoing type at high production rates either continuously or quantitatively in large numbers, and also apparatus and products useful in practicing such method. As will be appreciated, the method of the invention greatly facilitates cell assembly while minimizing handling of individual cell components during the assembly process. The invention also provides a novel electrolytic capacitor cell and for its convenient assembly into an end product which may consist of multiple stacked cells that may take various forms or shapes.

In accordance with the method of the invention, a plurality of electrolytic capacitor cells are formed integrally in a composite or laminated belt in a predetermined pattern and subsequently severed or otherwise separated therefrom to provide a plurality of individual cells or stacked cell sets of desired shape. The belt includes at least one inner sheet of separator material, outer sheets of connector material, and intermediate sheets of gasket material respectively interposed between the inner sheet and the respective outer sheets. Each intermediate sheet has a plurality of holes arranged in a predetermined pattern and aligned with the holes in the other intermediate sheet for accommodating respective electrodes of a like number of pairs which have opposite surfaces in operative contact with the inner and the respective outer sheets.

In one form of laminated belt, the outer and intermediate sheets include conductive and non-conductive rubber sheets, respectively, and the inner sheet includes a relatively thin sheet of polypropylene or other material suitable for use as an ion conducting/electron insulating separator in the capacitors. Also, the intermediate sheets are of sufficient thickness laterally to contain the electrodes in holes therein which are spanned at their opposite ends by the inner and respective outer sheets, and such inner, intermediate and outer sheets may be adhered together at their respective interfacial surfaces by double sided adhesive strips or like bonding means having holes or voids aligned with the holes in the intermediate sheets to permit operative contact of the electrodes with the inner and respective outer sheets. In another form of laminated belt, the intermediate and outer sheets may be co-vulcanized to provide a strong cross-linked bond therebetween.

Further in accordance with the invention, the laminated belt may be continuously formed and the cells subsequently punched or severed therefrom in a conveyor line wherein continuous sheets, respectively consisting of connector, gasket and separator materials, are assembled together at strategic locations along the conveyor line. Alternatively, laminated belts of discrete length may be formed by assembling together similar length sheets respectively composed of connector, gasket and separator materials. In either case, preformed electrodes or unformed electrode materials are placed in respective pockets or cavities in partially formed belts prior to assembly of both the connector-forming and separator-forming sheets on opposite sides of respective gasket-forming sheets.

Moreover, either assembly procedure is greatly facilitated by applying an adhesive layer as in the form of double-sided adhesive tape to opposite sides of the sheets of gasket material with release paper or the like covering the outer surfaces of the adhesive layers or strips. Holes are then formed in the resulting composite sheets in like predetermined patterns as by passing the same through punch and die apparatus, such holes being sized to receive and laterally contain respective electrodes. Thereafter one side of each composite sheet may have the release paper peeled therefrom and a sheet of either connector or separator material applied thereto with the latter spanning and thus closing one end of each hole in the composite sheet to form electrode receiving pockets or cavities. Preformed electrodes or unformed electrode materials then may be placed in the pockets or cavities against the closed end thereof, and the release paper on the other side of the composite sheet thereafter removed for application of a sheet of either separator or connector material. As will be appreciated, a pair of the aforesaid composite sheets will be secured to opposite sides of a common sheet of separator material with the holes therein aligned and the sheets of connector material located at the outsides of the resultant laminated belt, although the assembly sequence may vary in various respects.

To the accomplishment of the foregoing and related ends, the invention, then comprises the features hereinafter fully described and particularly pointed out in the claims, the following description and the annexed drawings setting forth in detail certain illustrative embodiments of the invention, these being indicative, however, of but a few of the various ways in which the principles of the invention may be employed.

BRIEF DESCRIPTION OF THE DRAWINGS

In the annexed drawings:

FIG. 1 is an exploded perspective view of a capacitor cell made in accordance with the subject invention;

FIG. 2 is an enlarged diametrical section through the capacitor cell of FIG. 1;

FIG. 3 is a diagrammatic perspective view illustrating one mode of practicing the method of the invention involving the continuous production of a laminated belt from which capacitor cells are separated;

FIGS. 4-6 are enlarged transverse sections through the laminated belt at various stages of its assembly, taken along the lines 4—4, 5—5 and 6—6 of FIG. 3, respectively;

FIG. 8 is a fragmentary perspective view, partially broken away and in section, of a laminated belt employed in accordance with another mode of practicing the method of the invention;

FIG. 9 is a diagrammatic perspective view illustrating a punch apparatus having use with the laminated belt of FIG. 8; and FIG. 10 is a section through an electrical storage device consisting of a plurality of capacitor cells taken substantially along a diameter thereof.

DETAILED DESCRIPTION

Figure 7:
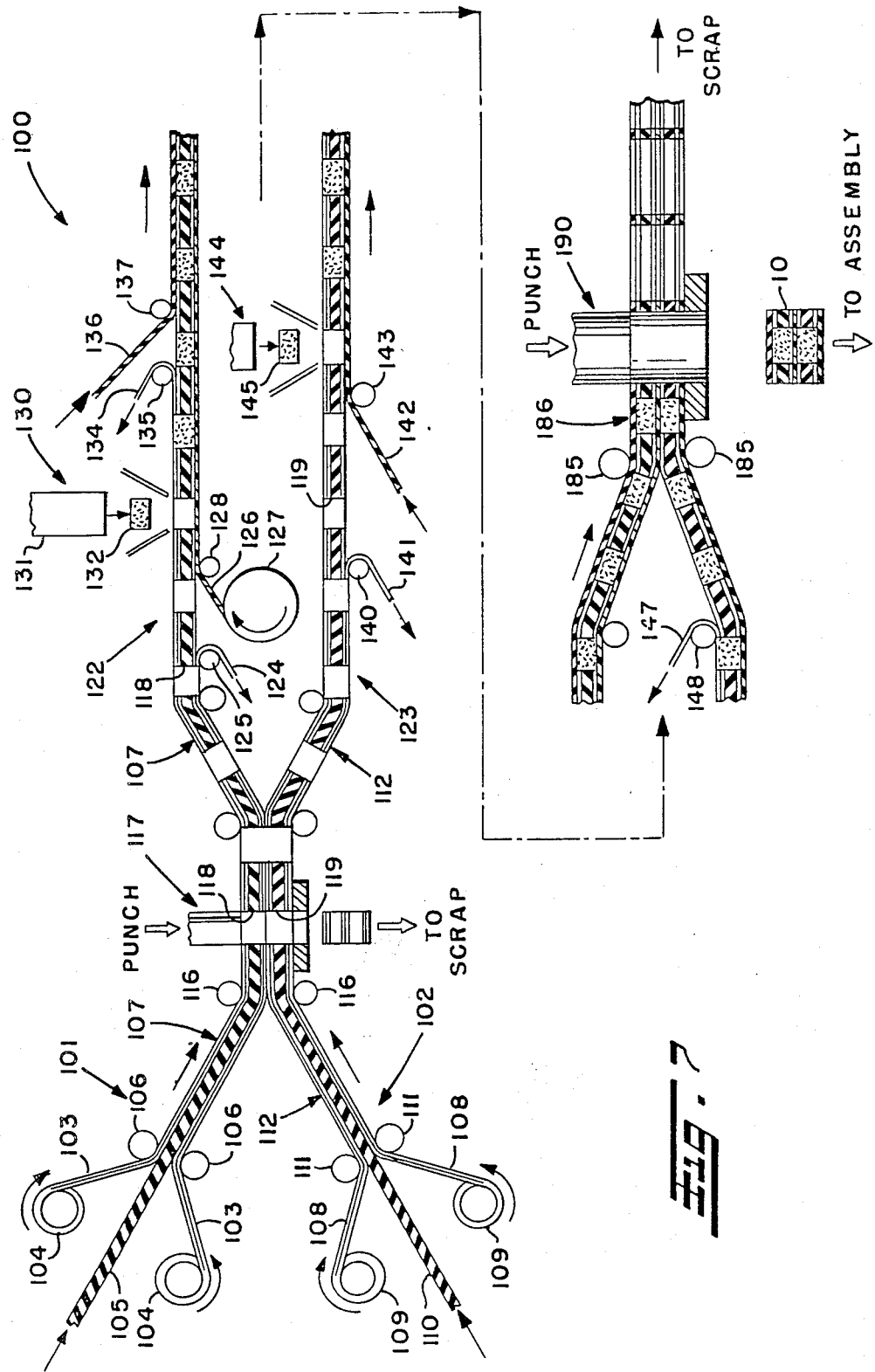
FIG. 7 is a diagrammatic section illustrating another mode of practicing the method of the invention also involving the continuous formation of a laminated belt from which capacitor cells are removed.

Referring now in detail to the drawings, an exemplary capacitor cell made in accordance with the subject invention is designated generally by reference numeral 10 in FIGS. 1 and 2. The capacitor cell 10 comprises a pair of electrodes 12, a separator 13, a pair of annular gaskets 14, and a pair of electrode connectors 15. In addition, the capacitor cell includes annular adhesive elements 16 which maintain the other components of the cell in assembled relationship as seen in FIG. 2.

The annular gaskets 14 have central holes 18 in which respective electrodes 12 are confined between the separator 13 and respective electrode connectors 15. The gaskets are affixed at their inner surfaces to opposite sides of the porous separator by respective adhesive elements 16 and at their outer surfaces to respective electrode connectors by other adhesive elements. Each adhesive element has a central hole 19 aligned with the central holes 18 in the gaskets to permit operative contact of the electrodes with the porous separator and respective electrode connectors.

In general, the paste electrodes 12 may be formed from conductive material in admixture with an electrolyte. For example, the conductive material may be activated carbon particles and the electrolyte a highly conductive aqueous solution of an acid, base or salt. The resultant admixture may have the consistency of a paste which may be pressed or formed to desired shape. In use, such electrodes provide for substantial build-up of opposite charges at the electrode/electrolyte interfaces which may have relatively large surface areas giving high capacitance to the resultant capacitor cell.

The separator 13 may be made of a highly porous material that can function as an electron insulator between the electrodes 12 yet allow free and unobstructed ion movement between the electrodes for development of opposite charges on the electrodes. The pores of the separator must be small enough to prevent contact between the opposing electrodes, since such a condition would result in a short circuit and consequent rapid depletion of the charge accumulated on the electrodes. The separator also may be a non-porous ion-conducting material, such as an ion exchange membrane. For example, the separator may be made of polypropylene having a thickness on the order of a few mils.

As above indicated, the gaskets 14 serve to confine or contain the electrodes 12 which may have a paste-like consistency. Preferably, the gaskets 14 have a thickness corresponding to the desired thickness of the electrodes. It is noted however that containment of the electrodes may also be obtained by providing, as by molding, inner recesses or pockets in relatively thicker connectors or at opposite sides of a relatively thicker separator, whereby the gaskets would be of correspondingly reduced thickness. The gaskets also preferably are ion and electron insulators and may be flexible to accommodate expansion and contraction of the electrodes as well as any bending of the cell. For example, the gaskets may be made of nonconductive butyl rubber because of its chemical stability and low permeability.

The electrode connectors 15 primarily serve as electrode current collectors and additionally may serve as an inter-cell ionic insulators. Accordingly, the connectors are made of conductive material and preferably are flexible like the gaskets 14. For example, the connectors may be made of butyl rubber containing a high concentration of conductive particles such as carbon black.

For further details of types and particulars of materials that may be employed to form the electrodes 12, separator 13, gaskets 14 and connectors 15, reference may be had to U.S. Pat. Nos. 3,536,963; 3,634,736; 3,648,128; 3,656,027 and 4,023,079. As for the other or adhesive elements 16, such may be made of double sided adhesive material. Such elements, for example, may be formed from double sided adhesive tape having an adhesive applied to opposite surface of a thin flexible plastic carrier.

Referring now to FIG. 3, one mode of implementing continuous manufacture of capacitor cells 10 in accordance with the invention can be seen to involve an assembly line designated generally by reference numeral 30. As utilized herein, references to separator, gasket or connector materials are meant to mean, respectively, those materials of which the separator 13, gaskets 14 and connectors 15 may be formed for use in the capacitor cell 10.

As shown, a sheet 32 of gasket material may be fed from a roll 33 along an upper branch conveyor line 34 to and through a punch apparatus 35. Upstream of the punch apparatus, relatively narrow, double sided adhesive strips or tapes 36 are taken from respective rolls 37 and centrally applied to opposite sides of the wider, longitudinally moving gasket sheet 32 at opposed pinch rollers 38. At this point, release paper covering one surface of each adhesive tape is left in place and disposed on the respective outer sides of the thus formed composite sheet 39 which passes to the punch apparatus 35. As will be appreciated, the release paper and to some extent the adhesive tapes essentially render the composite sheet longitudinally inextensible notwithstanding the elastic nature of the gasket sheet 32 which preferably is made of rubber.

As the composite sheet 39 is passed or indexed through the punch apparatus 35, plugs 42 are punched therefrom to provide holes 43. As shown, sets of two side-by-side holes may be formed during respective punching operations and spaced at precise intervals from previously formed sets through controlled sequential indexing of the composite sheet. To facilitate such indexing and further indexing and aligning of the composite sheets, a plurality of perforations 44 also may be punched in the gasket sheet 32 along each longitudinal edge thereof outside of the adhesive tapes and release paper thereon. Such perforations are utilized to engage the teeth of indexing sprocket wheels 45 located strategically along the length of the conveyor 30. The sprocket wheels 45 and other transfer rollers located along the conveyor are uniformly driven such as by chains 46 and a common drive (not shown) for uniform sequential indexing of the composite sheet through the various operational stations of the conveyor line.

Along a lower branch conveyor line 47, another composite sheet 48 is formed and provided with holes 49 and perforations 50 in like manner to the composite sheet 39, this being schematically represented by the line 51. Although separate punch apparatus may be employed for each branch line as indicated, the composite sheets alternatively may be indexed together and through a single punch apparatus and then directed along respective upper and lower branch lines in the below described manner.

As the composite sheet 48 having holes 49 is advanced along the lower branch conveyor line 47, the release paper 52 on the underside thereof is removed at roller 53 and taken up on roll 54. This exposes the adhesive surface on the underside of the composite sheet for application of a sheet 55 of connector material being fed from roll 56. The connector sheet 55 has a width corresponding to the width of the adhesive tape and is aligned to fully cover the adhesive surface of the tape. In addition, the connector sheet spans and thus closes the bottom ends of the holes 49 in the composite sheet 48 to form upwardly opening pockets or sockets 57 as best seen in FIG. 4. As also seen in FIG. 4, the gasket sheet 58 in the composite sheet 48 may have inextensible ropes 59 embedded therein along its longitudinal edges further to render it longitudinally inextensible for accurate indexing along the conveyor line.

With the connector sheet 57 applied to the underside of the composite sheet 48, the resultant assembly is advanced through a lower electrode insertion station 60. As shown, the electrode insertion station may consist of an electrode material storage hopper 61 which dispenses the electrode material 62 onto the composite sheet moving thereunder. The electrode material falling onto the composite sheet collects upstream of a knife or doctor blade 63 between longitudinally extending guides 64 whereby the material will fall into and fill the holes 49. Then as the composite sheet moves past the doctor blade, excess electrode material will be scraped off the top of the composite sheet whereby the electrode material filling the holes will have a top surface essentially flush with the top surface of the composite sheet.

It is noted that the illustrated electrode insertion station 60 is only exemplary of one technique by which the electrode material 62 may be introduced into the holes 49 in the composite sheet 48. As an alternative arrangement, the electrode material first may be preformed as pellets or wafers sized to fit in the holes 49 and then sequentially placed into such holes as they move through the insertion station.

After exiting the insertion station 60, the release paper 66 on the upper side of the composite sheet 48 is removed at a roller 67 and taken up on a roll 68. This accordingly exposes the adhesive surface on the upper side of the composite sheet for application of a sheet 69 of separator material, such being taken from a supply roll 70 and applied at roller 71. Like the connector sheet 57 on the underside of the composite sheet 48, the separator sheet has a reduced width corresponding to that of the adhesive tape to which it is aligned and adhered. As best seen in FIG. 5, the separator sheet will close the top ends of the holes 49 whereby the electrode material 62 will be fully contained within the gasket sheet between the separator and connector sheets.

As the composite sheet 48 is being advanced along the lower branch conveyor line 47 as aforedescribed, the composite sheet 39 will be simultaneously advanced along the upper branch conveyor line 34. As seen in FIG. 3, the composite sheet 39 passes from the punch apparatus 35 and then downwardly for application to the lower composite sheet 48. Prior to the upper composite sheet 39 being brought into engagement with the lower composite sheet 51, the release paper 74 on the lower side of the upper composite sheet is removed at a roller and taken up on a roll 76. Accordingly, the adhesive surface on the underside of the upper composite sheet will be exposed for adhering such sheet to the separator sheet 69 adhered to the top side of the lower composite sheet as both composite sheets are controllably indexed between opposed pinch rollers, only the upper one being seen at 77. At their ends, the pinch rollers are provided with sprocket wheels 45 to ensure proper alignment of the holes in one composite sheet with the corresponding holes in the other as best seen in FIG. 6. As also seen in FIG. 6, the bottom or lower ends of the holes 43 in the upper composite sheet will be closed by the separator sheet to form upwardly opening pockets 78.

With the upper and lower composite sheets 39 and 48 mated as aforedescribed, the resultant assembly is advanced through an upper electrode insertion station 80 which, as shown, is similar to the upper electrode insertion station 60. As the assembly moves through such station, the holes 43 in the upper composite sheet are filled with electrode material 81 which is leveled to the top surface of the upper composite sheet by the doctor blade 82.

After exiting the upper electrode insertion station 80, the release paper 84 on the upper side of the upper composite sheet 39 is removed at a roller 85 and taken up on a roll 86. This accordingly exposes the adhesive surface on the upper side of the upper composite sheet for application of a sheet 87, such being taken from a supply roll 88 and applied at roller 89. Like the bottom connector sheet 55, the top connector sheet 87 has a reduced width corresponding to that of the adhesive tape to which it is aligned and adhered.

At this point in the assembly process, there now is provided a laminated belt 90 having a layered construction similar to that shown in FIG. 2. The laminated belt is indexed through a punch apparatus 91 which operates to sever individual capacitor cells 10 from the belt. The belt is sequentially indexed into alignment with the dies 93 of the punch apparatus, such indexing being facilitated by indexing sprocket wheels 45 cooperating with the perforations provided along the edge of the belt. As may be desired, the cells removed from the belt may be guided for receipt in magazine 94 which facilitates subsequent handling of the individual cells. Alternatively, the cells may be left in the belt for subsequent handling, storage and/or delivery to an assembly unit wherein the cells might be severed from the belt and directly and/or simultaneously assembled with other components to form finished energy storage or capacitor devices. Accordingly, the belt may serve as an intermediate end product that may be delivered, shipped or otherwise presented to a final assembly site for the capacitor cells.

Turning now to FIG. 7, another mode of implementing continuous manufacture of capacitor cells 10 in accordance with the invention can be seen to involve another form of assembly line designated generally by reference numeral 100. As seen at the left in FIG. 7, the conveyor line has upper and lower feeder lines 101 and 102. Along the upper feeder line 101, doubled sided adhesive strips or tapes 103 are taken from respective rolls 104 and centrally applied to opposite sides of a longitudinally moving gasket sheet 105 at opposed pinch rollers 106. At this point, release paper covering one surface of each adhesive tape is left in place and disposed on respective outer sides of the thus formed composite sheet 107. Similarly, along the lower feeder line 102, double sided adhesive strips or tapes 108 are taken from respective rolls 109 and applied to opposite sides of a longitudinally moving lower gasket sheet 110 at opposed pinch rollers 111 with release paper on the adhesive tape disposed on respective outer sides of the thus formed lower composite sheet 112.

As the upper and lower composite sheets 107 and 112 are advanced longitudinally, they are brought together and aligned at opposed pinch rollers 116 for passage or indexing through a punch apparatus 117. In a single punching action, holes 118 and 119 are provided in the upper and lower composite sheets 107 and 112, respectively, such holes being spaced at precise intervals from previously formed sets through controlled sequential indexing of the composite sheets. As will be appreciated, any number of holes may be provided across the width of the composite sheets. Also, a plurality of perforations may be punched in the gasket sheets 105 and 110 in a manner similar to that aforedescribed with respect to assembly line 30. Like before, such perforations may be utilized to facilitate indexing and further indexing and aligning of the upper and lower composite sheets along the assembly line 100.

After exiting the punch apparatus 117, the upper and lower composite sheets 107 and 112 are advanced along respective upper and lower branch conveyor lines 122 and 123. As the upper composite sheet 107 is advanced along the upper branch line 122, the release paper 124 on the underside thereof is removed at roller 125. This exposes the adhesive surface on the underside of the upper composite sheet for application of a sheet 126 of separator material, such being taken from a supply roll 127 and applied at roller 128. The separator sheet 126 at this point will span and thus close the bottom ends of the holes 118 in the upper composite sheet to form upwardly opening pockets.

Continuing along the upper branch line 122, the upper composite sheet 107 is advanced through an upper electrode insertion station 130. The upper electrode insertion station may consist of an electrode magazine 131 which stores preformed electrodes 132 and dispenses them into the holes 118 as the composite sheet 107 is indexed therebeneath.

After exiting the insertion station 130, the release paper 134 on the upper side of the upper composite sheet 107 is removed at a roller 135 to expose the adhesive surface on the upper side of such upper composite sheet for application of a sheet 136 of connector material at roller 137.

As the upper composite sheet 107 is being advanced along the upper branch conveyor line 122 as aforedescribed, the lower composite sheet 112 will be simultaneously advanced along the lower branch conveyor line 123. The lower composite sheet passes from the punch apparatus 117 to a roller 140 which effects removal of the release paper 141 on the underside of such composite sheet. This exposes the adhesive surface on the underside of the composite sheet for application of a sheet 142 of connector material at roller 143. Downstream of the roller 143, the lower composite sheet advances through a lower electrode insertion station 144 which places preformed electrodes 145 in the holes 119 which are closed at their bottom ends by the bottom connector sheet 142.

After exiting the insertion station 144, the release paper 147 on the upper side of the lower composite sheet 112 is removed at a roller 148 to expose the adhesive surface on the upper side of such composite sheet. Thereafter, the upper and lower composite sheets at the exit ends of the branch lines 122 and 123 are brought together at opposed pinch rollers 185. As will be appreciated, the adhesive surface on the upper side of the lower composite sheet will adhere to the underside of the separator sheet 126 to form a laminated belt 186. Such laminated belt 186 will have a laminated construction similar to that seen in FIG. 2.

After the laminated belt 186 has been formed, it is passed through a punch apparatus 190 which severs individual capacitor cells 10 from the belt area. As in the assembly line 30, the capacitor cells 10 punched from the belt may be received in magazines for facilitating subsequent handling of the cells and their assembly in finished energy storage devices.

Reference now being had to FIGS. 8 and 9, it will be seen that capacitor cells also may be manufactured quantitatively in large numbers. This mode of assembly involves the integral formation of a plurality of capacitor cells in a composite belt 200 having a discrete length in contrast to the continuous belts formed by either of the aforedescribed continuous assembly modes. The composite belt is formed by assembling together similar length sheets respectively composed of connector, gasket and separator materials.

As seen in FIG. 8, the composite belt 200 comprises a plurality of electrodes 202, a separator sheet 203, a pair of gasket sheets 204 and a pair of connector sheets 205. In addition, the belt includes adhesive sheets 206 which maintain the other sheets of the cell in assembled relationship.

The gasket sheets 204 have respective holes 208 arranged in like predetermined patterns in which respective electrodes 202 are confined between the separator sheet 203 and respective connector sheets 205. The gasket sheets are affixed at their inner surfaces to opposite sides of the separator sheet by respective adhesive sheets 206 and at their outer surfaces to respective connector sheets by other adhesive sheets. Each adhesive sheet has holes 210 aligned with the holes 208 in the gasket sheets to permit contact of the electrodes with the separator sheet and respective connector sheets.

The component sheets of the belt may be assembled in any desired sequence. It is noted, however, that the electrodes 202 necessarily must be placed in the holes 208 in the gasket sheets 204 prior to assembly of both the separator and connector sheets 204, 205 on opposite sides thereof. Preferably either the separator or connector sheet is applied to one side of the respective gasket sheet to close one end of the holes to form pockets into which preformed electrodes or unformed electrode material may be placed. Thereafter the other of the separator or connector sheet is applied to the opposite surface of the gasket sheet to contain the electrodes in the holes.

Once formed, the composite belt 200 may be positioned in a punch apparatus 212 which may simultaneously sever capacitor cells from the belt, the outlines of which are indicated by broken lines 213. As seen in FIG. 9, such punch apparatus 212 may comprise a belt receiving member 215 having a horizontal slot 106 for receipt of the belt 200. The member also has vertical guide bores 217 arranged in a pattern corresponding to that of the cells integrally formed in the belt. The punch apparatus further comprises a plurality of similarly arranged cutting dies 218 which are movable through corresponding vertical bores 217 to effect the punching of the cells from the belt. Upon exiting the vertical bores, the capacitor cells may be received in respective magazines 219 mounted on a carrier 220 which facilitates further handling of the capacitor cells.

As an alternative to the aforementioned punch apparatus, other means may be employed to separate individual cell units from the composite belt. For example, the cell units may be severed from the belt by knives. By utilizing knives, the cells may be formed in the composite belt with respective boundaries thereof located adjacent one another. The cells then may be separated from one another by passing the knives along the cell boundaries, such procedure either entirely eliminating or minimizing scrap. As will be appreciated, the cells may take various shapes such as square, rectangular or hexagonal shapes which provide for close packing of the cells in the laminated belt. Cells with complex contours also may be provided for special applications.

Referring now to FIG. 10, an exemplary energy storage device embodying a plurality of capacitor cells 10 of the foregoing type is designated generally by reference numeral 230. The device includes a can or container 231 having a closed end 232 and an open end 233. The capacitor cells are stacked atop the other within the can with the bottom electrode connector of the lowermost capacitor cell in contact with the bottom wall or closed end 232 of the can. Accordingly, the can may serve as either the cathode or anode of the device, the latter being more akin to conventional capacitor constructions. To prevent the cells from shortcircuiting by contact with the can, a cylindrical insulating sleeve 234 is disposed between the outer diameter of the stacked cells and the inner diameter of the can side wall 235 over their coextensive lengths.

At the top of the device, a metallic disc 238 is placed in contact with the upper electrode connector of the uppermost cell. The metal washer is held in contact with such electrode connector by a relatively rigid insulating washer 239 which in turn is held in place by the inwardly crimped top marginal edge portion 240 of the can. As also shown, a terminal 241 connected to the metal plate extends upwardly through a hole 242 in the washer and beyond the top end 233 of the can.

As above described, adhesive layers as in the form of doublesided adhesive tapes are utilized to join together adjacent sheets of the laminated belts. The invention, however, further encompasses joinder or bonding of adjacent connector and gasket sheets by covulcanization. During the assembly process, the connector and gasket sheets are brought together when in a partially cured state and subsequently finally cured to provide a strong cross-linked bond therebetween at their interfacial surfaces. The respective curing systems for the connector and gasket sheets should be mutually compatible and suitable heat and/or pressure application stations may be provided in the assembly line to promote covulcanization of the sheets.

Although the invention has been shown and described with respect to preferred embodiment, equivalent alterations and modifications may occur to others skilled in the art upon the reading and understanding of this specification. The present invention includes all such equivalent alterations and modifications, and is limited only by the scope of the following claims.

We claim:

1. An apparatus for manufacturing electrical storage cells of the type including a pair of opposed electrodes, a separator between and in operative contact with inner surfaces of the electrodes, a pair of electrode connectors respectively in operative contact with outer surfaces of the electrodes, and a pair of gaskets respectively confining the electrodes between the separator and respective electrode connectors, said apparatus comprising means for longitudinally advancing and assembling together an inner sheet of separator material, outer sheets of connector material at opposite sides of the inner sheet, intermediate sheets of gasket material between the inner sheet and respective outer sheets with holes in each intermediate sheet aligned with respective holes in the other intermediate sheet and spanned at opposite ends by the inner sheet and respective outer sheet, to form a composite belt including a plurality of such cells intergrally in such belt; means for positioning electrodes at such holes in one intermediate sheet and other electrodes at such holes in the other intermediate sheet prior to assembling of the inner and respective outer sheets at opposite sides of the respective intermediate sheet; and means for separating the individual cells from the composite belt.

2. An apparatus as set forth in claim 1, further comprising, upstream of said means for assembling, means for applying double-sided adhesive tape to both sides of each intermediate sheet of gasket material to form respective composite sheets, and means for punching the composite sheets to form the holes in the intermediate sheets of gasket material as well as like size and aligned holes in the adhesive tape.

* * * * *